United States Patent [19]

Gerhardt

[11] Patent Number: 4,648,571

[45] Date of Patent: Mar. 10, 1987

[54] TRANSVERSE THRUST LIFT AUGMENTATION SYSTEM

[75] Inventor: Heinz A. Gerhardt, Redondo Beach, Calif.

[73] Assignee: Northrop Corporation, Hawthorne, Calif.

[21] Appl. No.: 632,374

[22] Filed: Jul. 19, 1984

[51] Int. Cl.[4] .................. B64C 9/58; B64C 21/04; B64C 23/06
[52] U.S. Cl. .................................. 244/207; 244/199
[58] Field of Search .................. 244/207, 12.1, 12.5, 244/52, 199

[56] References Cited

U.S. PATENT DOCUMENTS

| | | | |
|---|---|---|---|
| 1,496,373 | 6/1924 | Hunt | 244/207 |
| 2,894,703 | 7/1959 | Hazen et al. | 244/199 |
| 2,941,751 | 6/1960 | Gagarin | 244/207 |
| 3,480,234 | 11/1969 | Cornish, III | 244/199 |
| 3,525,486 | 8/1970 | Wimpenny | 244/199 |
| 3,806,068 | 4/1974 | Blythe et al. | 244/12.5 |
| 3,831,885 | 8/1974 | Kasper | 244/199 |

FOREIGN PATENT DOCUMENTS

| | | | |
|---|---|---|---|
| 804835 | 1/1969 | Canada | 244/12.5 |
| 1208414 | 2/1960 | France | 244/12.1 |

OTHER PUBLICATIONS

Dixon, C. J. et al. Theoretical and Experimental Investigations of Vortex Lift Control by Spanwise Blowing, vol. 1, LG73ER-O169, 15 Sep. 1973, Lockheed-Georgia Company, Marietta, Georgia.

Dansby, Ted, A Study of the Effects of Spanwise Blowing on the Lift of Trailing Edge Flight Controls, May 1980, Lockheed-Georgia Company, Marietta, Georgia.

Primary Examiner—Charles T. Jordan
Attorney, Agent, or Firm—Terry J. Anderson; Robert B. Block

[57] ABSTRACT

Disclosed is a propulsive lift mechanism which improves the short takeoff and landing capabilities of an aircraft by generating transverse thrust lift augmentation by exhausting gasses ported from the main exhaust through a nozzle, close behind and parallel with the trailing edges of the wings of the aircraft, which transverse jet together with thrust vectoring means of the aircraft, provide improved aerodynamic lift on the wings of the aircraft. The transverse nozzle, having means adjustable for creating reverse thrust, and optionally for discharging said exhaust gasses with a swirling motion, may provide both increased circulation of air over the wings as well as improved flow separation control on the trailing edge flaps of the wings. Exhaust gas from the jet engine of the aircraft is ported to the transverse nozzles by flap valves operating in the exhaust of the jet engine.

11 Claims, 5 Drawing Figures

TRANSVERSE THRUST LIFT AUGMENTATION SYSTEM

BACKGROUND OF INVENTION

1. Field of Invention

The present invention in propulsion lift technology relates to augmenting the airflow past an aircraft wing by exhausting gas outwardly of the body of the aircraft from a location behind the wing root in a direction substantially parallel to the wing trailing edge to induce lift on the wing and to inhibit flow separation thereby improving the effectiveness of the trailing edge flap. The resultant lift increase can be used to shorten takeoff and landing distances of the aircraft.

2. Description of Prior Art

Various schemes for increasing aerodynamic lift through blowing air at high pressure over wing surfaces have been suggested in the past. Some have been applied to actual airplanes. To distinguish the schemes from each other, one must categorize them by air jet position and by physical action.

In terms of air jet position, a distinction must be made between air jets exhausting in the same direction as the free stream, i.e. chordwise blowing and air jets exhausting substantially normal to the free stream. In the latter case, air jets exhausting normal to the lifting surface and those exhausting in spanwise direction must be distinguished. The present invention falls into the category of spanwise blowing, and further discussion is restricted to same.

Two other schemes of spanwise blowing are also known. The first involves spanwise blowing with a concentrated jet near the leading edge of a wing for the purpose of enhancing the leading edge vortex and increasing vortex lift thereby. A description of that system is contained in "Theoretical and Experimental Investigation of Vortex Lift Control by Spanwise Blowing" by J. G. Theisen and R. M. Scruggs, Lockheed, Ga., September, 1973. This concept is primarily aimed at increasing lift at high angles of attack as a necessary condition for leading edge vortex formation. However, this characteristic makes the aircraft less suitable for short takeoff and landing applications which requires substantial lift increase in the low to moderate angle of attack range. In this case, compressor bleed air is envisioned for the source of the gas to be exhausted spanwise.

The second scheme involves spanwise blowing near the hingeline of a control surface or trailing edge flap for the purpose of providing boundary layer control to prevent flow separation. A description of that system is contained in "A Study of Spanwise Blowing on the Lift of Trailing Edge Flight Controls" by Ted Dansby, Lockheed, Ga., May, 1980. In this study, spanwise blowing is restricted to preventing flow separation, and is limited to that concept.

The present invention distinguishes itself by jet location, aerodynamic action, and power source from the inventions taught in the prior art. Further, a design solution for trimming the propulsive lift-induced pitching by utilizing thrust vectoring is set forth. Also described as a secondary function of the transverse thrust nozzles is the utilization of these nozzles for thrust reversal. The synergistic effect of the total system design, incorporating transverse thrust, vectored thrust, and reverse thrust, adds to the uniqueness of this invention in providing for improved maneuverability, and optimum short takeoff and landing performance for an aircraft.

The aerodynamic action of the transverse thrust increases aircraft lift through potential flow augmentation or supercirculation achieved primarily through the entrainment into the transverse jets of the air passing about the wings of the aircraft. This flow mechanism has not been identified in prior art describing other spanwise blowing concepts. In addition, the transverse jets inhibit flow separation over the trailing edge flaps thereby improving the effectiveness of those flaps.

Another feature of the present invention includes the deflected trailing edge flaps. By designing the aircraft such that the wing trailing edge is located proximate the same longitudinal position as the engine tailpipe and the transverse nozzle, engine exhaust gas can be tapped from the tailpipe through the transverse nozzle.

By the proximity of the engine exhaust location relative to the wing trailing edges, exhaust gas is available without the requirement of ducting of hot gases from a more forward or aft location.

Still another feature of this invention is the use of a swirling jet to increase the efficiency of the jet-induced lift generation process.

PRIOR ART STATEMENT

The following patents and study are cited as the most pertinent art of which the applicant is aware:

| U.S. Pat. No. | Name | Date |
|---|---|---|
| 2,568,813 | B.K.O. Lundberg | 25 Sept. 1951 |
| 2,847,822 | G.F. Hausmann | 19 Aug. 1958 |
| 2,857,119 | D. Morguloff | 21 Oct. 1958 |
| 2,879,014 | S.W. Smith et al. | 24 Mar. 1959 |
| 2,964,905 | C.T. Hewson et al. | 20 Dec. 1960 |
| 3,117,750 | L.S. Snell | 14 Jan. 1964 |
| Experimental Research Study LG-73ER-0169 | D.J. Dixon et al | 15 Sept. 1973 |
| "A Study of Spanwise Blowing on the Lift of Trailing Edge Flight Controls" by Ted Dansby, Lockheed Georgia, May, 1980 | | |

The concept described in U.S. Pat. No. 2,568,813 to Lundberg differs from the present invention in aerodynamic action and direction of the jets. The cited patent teaches the use of blowing in a rearward direction to achieve boundary layer control.

The patent to Hausmann discloses a thrust modifying device said to direct the flow of exhaust gas of an aircraft power plant radially outwardly and transversely. In this patent, the thrust modifying device is located some distance behind the wing toward the aft end of the aircraft. Thus, the thrust does not influence wing lift and has no unexpected effect on the airflow about the wings of the aircraft.

The patent to Morguloff combines reaction control and thrust reversal into a unified design.

The patent to Smith et al. discloses a thrust modifying or jet diverter assembly for changing the direction of airflow from the power plant of the aircraft. This jet diverter assembly is located below the wing, and is intended for rearwardly directed horizontal and downward discharge conditions by adjustment of the flow guide vanes. This system is not designed to affect the lift of the wing and is not intended to direct the exhaust in a transverse direction.

U.S. Pat. No. 2,964,905 to Hewson deals with reaction control using engine exhaust gases in conjunction with vertically mounted engines which produce direct lift from engine thrust.

The Snell patent discloses nozzle devices through which air and exhaust gas products of propulsion are ejected. Two nozzle devices are arranged on opposite sides of the aircraft, but are positioned toward the leading edge of the wings of the aircraft. The exhausts nozzles are adjustable between rearward and downward positions, but do not exhaust the gasses transversely of the aircraft.

Study LG-73ER-0169 relates to an experimental investigation of spanwise blowing over the surface of an aircraft wing as a means of controlling leading edge vortices and flow separation over the wing. The air source suggested in the study is either engine fan air or engine compressor bleed air. However, no mechanism is defined for using these sources of air. Further, the study does not consider the use of engine exhaust gases or the discharge of the gasses aft of the aircraft wing to increase air circulation over the wing and to inhibit flow separation.

BRIEF SUMMARY OF THE INVENTION

The capability of military aircraft to take-off and land in restricted spaces has become a design requirement for future fighters in response to the problems of having to operate from short or damaged airfields. In principle, the generation of propulsive lift achieved through thrust vectoring is a powerful means of reducing aircraft takeoff and landing speeds and thus the roll distances. Unfortunately, in the usual configuration layout of having the engines mounted in the back, the exhaust is too far away from the center of gravity of the aircraft making the pitching moments generated through thrust vectoring virtually untrimmable by conventional means.

In the present transverse thrust lift augmentation system, transverse gas jet exhausts are used to discharge gas laterally from behind the wing root and to generate aerodynamic lift on the wing through an upstream-acting entrainment process. The preferred location of the transversely directed air jets of the present invention is closely or immediately behind, slightly above, substantially parallel and proximate to the wing trailing edge. Throughout this specification, the words lateral, spanwise and transverse are synonymous when used in reference to the jets of the present invention. Since it is preferable that the jets exhaust substantially parallel to the wing trailing edge, the actual direction of the jets is dictated by the sweep angle of the wing trailing edge. Operating transverse thrust in conjunction with large trailing edge flap deflections results in the most efficient utilization of the transverse air jets. Transverse thrust provides increased circulation and inhibits flow separation on the trailing edge flap.

The induced lift acts fairly close to the center of gravity of the aircraft and, therefore, gives comparatively small pitching moments in large contrast to vectored thrust when applied at substantially the same longitudinal position as transverse thrust.

It is preferred that the present transverse thrust lift augmentation system be used in conjunction with an aircraft having its wing trailing edge close to the main engine exhaust nozzle as in a tailless or canard aircraft configuration. Furthermore, it is envisaged that the incremental nose-down pitching moment associated with the jet-induced lift is trimmed out by thrust vectoring in which the main exhaust jet is deflected upwardly at a slight angle.

During landing approach for short landing purposes, maximum power is maintained by diverting spanwise that portion of the thrust which surpasses the axial thrust needed to maintain the thrust-equal-drag condition of the airplane flying steadily along a chosen approach flight path. The resultant jet-induced lift increase lowers the approach speed and hence the ground roll distance. Having the engine run at full power during the approach is beneficial for subsequent thrust reverser application on the ground, as it eliminates the time delay in obtaining full thrust reversal caused usually by the slow engine response in accelerating from a low to a high power setting.

An object of the invention is to increase the effective lift of wings of an aircraft through augmenting the circulation about the wings by means of the transverse gas jets exhausting their gasses close to, and behind the wing trailing edges.

Another object is to increase the effectiveness of the transvere blowing by imparting a swirling motion on the exhausting air.

Still another object is to provide a means for discharging jet engine exhaust gas, compressor bleed air, or air provided by other sources laterally behind the trailing edge of an aircraft wing.

Yet another object of this invention is to utilize vectoring of thrust from the main exhaust nozzle to balance the nosedown pitching moments associated with transverse thrust.

A further object is to utilize the transverse thrust nozzles to achieve reverse thrust by deflecting the transverse jets forward through suitable flow deflectors associated with the nozzles.

The objects and other features of the present invention may be better understood by reference to the following description taken in connection with the accompanying drawings.

DETAIL DESCRIPTION OF THE INVENTION

Figure 1:
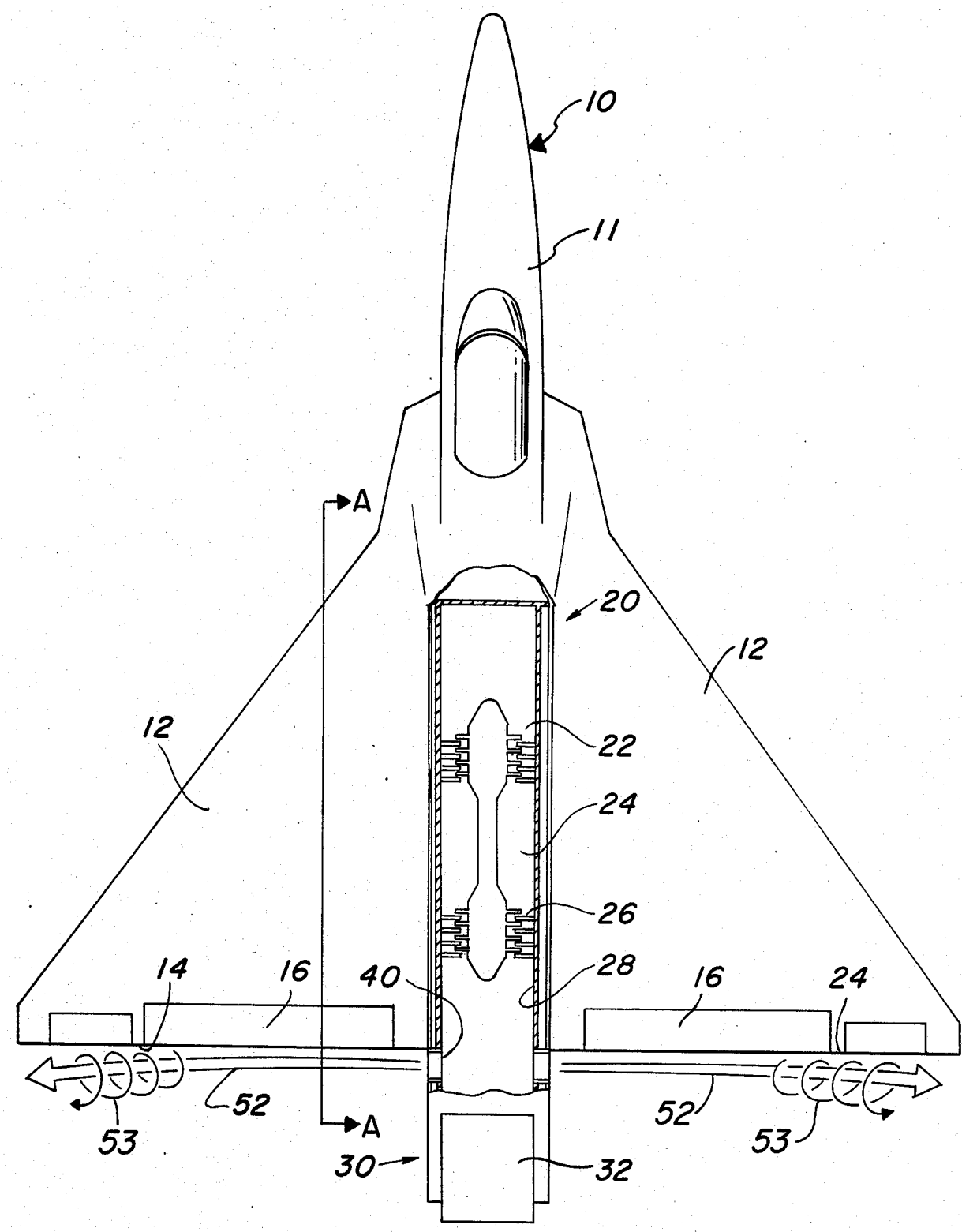
FIG. 1 is a top view, partly in cross-section, of a schematic representation of an aircraft incorporating the present invention.

Referring now to the drawings, FIG. 1 shows a generalized representation of an aircraft 10 having a fuselage 11, from which a pair of wings 12 extend to provide lift in a known manner. Along the trailing edge 14 of each wing 12 are one or more flaps 16 which may be positioned adjustably for providing control of lift and of certain maneuvering functions of the aircraft. One or more engines 20 are arranged in the fuselage for providing propulsion to the aircraft with the main propulsive gasses exhausting generally rearwardly of the aircraft. The engine 20 of FIG. 1, shown as a typical jet engine, includes an air inlet (not shown), a compressor 22, a combustion chamber 24, and a turbine 26. Exhaust products are in the form of gasses exiting from the turbine 26 of the engine. Normally, these gasses are directed through tailpipe 28 and are exhausted through the propulsion nozzle 30.

The propulsion nozzle 30 is provided with exhaust control portions 32 for vectoring or deflecting of the exhaust gasses. The thrust caused by the exhaust gasses is vectored or deflected up and down relative to the horizontal axis of the aircraft by the exhaust control portions 32. This vectoring capability is able to balance nosedown pitching moments as may be generated by a transverse thrust induced lift. In addition, the propulsion nozzle 30 can function as a valve to partially or completely close off the rearward propulsive exhaust flow, when it is desired to divert some or all of the exhaust gasses through the transverse nozzle assemblies 40. The various functions of the propulsion nozzle 30 are state-of-the-art features and therefore are not shown in detail in FIG. 1.

Figure 2:
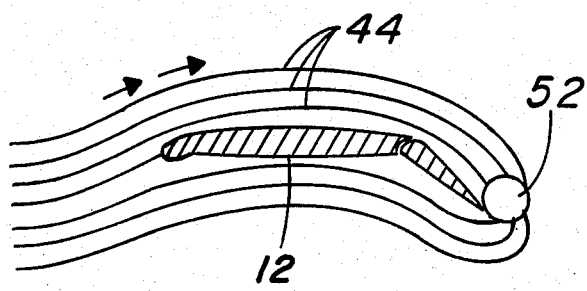
FIG. 2 is a schematic representation of air flow over a wing section as influenced by the transverse jets.

For purposes of generating increased lift on the wings 12 of the aircraft, the transverse nozzle assemblies 40 are arranged through the sides of the fuselage 11 and the sidewalls of the engine tailpipe 28 as illustrated in FIG. 1, at a position closely or immediately behind and proximate to the trailing edges 14 of the wings 12. A portion of the exhaust gasses from engine 20 are passed through nozzle assemblies 40 and directed outwardly from the fuselage 11 along the trailing edges of wing 12 on either side of the aircraft in transverse jets 52. As exhaust gasses are thus directed outwardly of the aircraft from the location immediately behind the roots of wings 12, in a direction substantially parallel to the wing trailing edges 14, the airflow passing over the aircraft wing surface becomes entrained into the stream of gasses being discharged in transverse jets 52. As shown in FIG. 2, the streamlines 44 representing the airflow passing over the wings 12 are accelerated through such entrainment into the transverse jets 52 causing an increase in the air circulation over the wing surface and an attendant increase in lift. The actions of the jets 52 in increasing the lift of the wing 12 are twofold. Relatively weak jets are sufficient to inhibit flow separation on the upper surface of the deflected trailing edge flaps 16. Increasing the strengths of the jets 52 beyond a threshold value sufficient to achieve attached flow on the deflected flaps 16 leads to further increases in lift. This mechanism is known as supercirculation wherein the total flowfield about the wing 12 is affected through an acceleration of the airflow over the wing 12 as it is entrained into the jets 52. The latter action is predominant and a unique feature of the present invention. The transverse thrust capability thus enables shorter takeoff and landing distances of aircraft.

Figure 3:
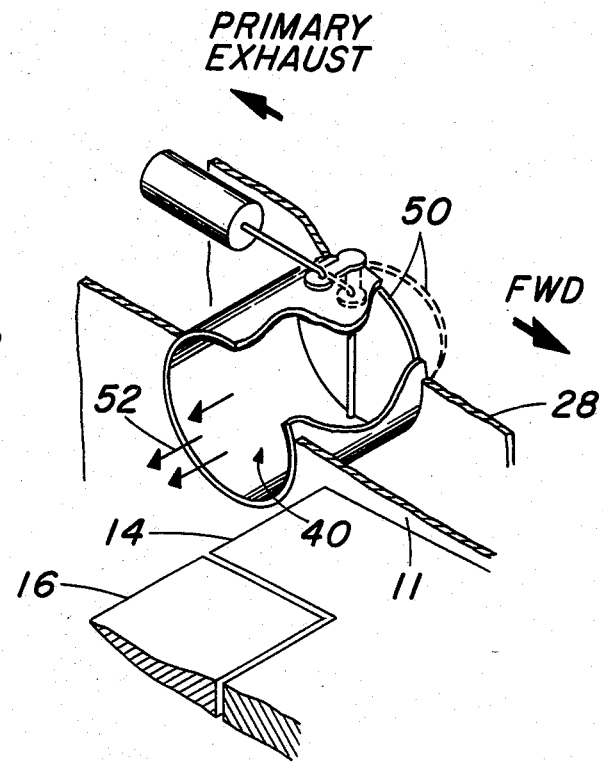
FIG. 3 is an isometric view of the exhaust control mechanism taken along section line A—A of FIG. 1 illustrating one form of a nozzle for exhausting jet exhaust gasses transversely of a jet engine.
Figure 4:
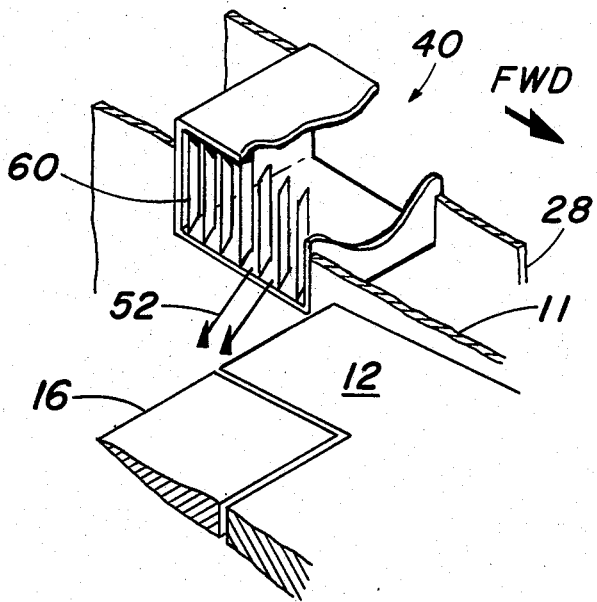
FIG. 4 is an isometric view of an alternate form of the transverse nozzle illustrated in FIG. 3, including means for controlling the direction of the gas jets through the transverse nozzles enabling a conversion from transverse thrust to reverse thrust.
Figure 5:
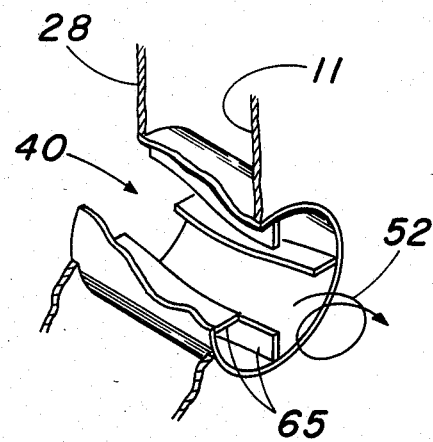
FIG. 5 is an isometric view of another form of the transverse nozzle illustrated in FIG. 3, including means for imparting a swirling motion onto the transverse jets.

The transverse nozzle assemblies may be implemented in a variety of geometrical cross sectional configurations. According to one embodiment as illustrated in FIGS. 3 and 5, the nozzle comprises either a generally circular or an elliptical cross sectional configuration. According to another embodiment as illustrated in FIG. 4, the nozzle comprises a generally rectangular cross sectional configuration. Other suitable geometries of nozzle cross sectional configuration may also be employed implementing the transverse jets 52.

Another embodiment of the transverse nozzle assembly 40, as shown in more detail in FIG. 3, penetrates the engine tailpipe and the adjacent fuselage structure 11. According to this embodiment, a controllable mechanism 50, adjustable from fully closed to fully open, regulates the exhaust flow 52 through the transverse nozzle assembly to control the quantity of exhaust gas diverted along the trailing edge 14 of the wing 12.

In FIG. 4, yet another embodiment of the transverse nozzle assembly 40 is shown as containing moveable flow deflectors 60, which are used to adjust the direction of the transverse jets 52 in a horizontal plane from a substantially perpendicular or transverse direction to a more forward direction relative to the direction of aircraft movement. When the deflectors 60 are positioned to cause the thrust to be deflected forwardly relative to an angle forward of perpendicular to the main exhaust path of the propulsion gasses, the resulting thrust induces forces retarding the motion of the aircraft. This reverse thrust capability is primarily utilized for decelerating the aircraft during landing ground roll or for specific tactical flight maneuvers.

Internally of the transverse nozzle assembly 40, as shown in still another embodiment in FIG. 5, exhaust turning units, shown as vanes 65, may be arranged to impart a swirling motion component 53 as shown in FIG. 1 to the transverse jets 52. The preferred direction of the swirl as shown in FIG. 1 is in the same direction as the circulation about the wing. This swirling motion thus further supplements the increase in lift generation effectiveness of the transverse jets 52, and improves entrainment of the airflow passing over the wing 12 and along the trailing edges 14 of the wings 12 of the aircraft 10.

Although the present invention has been disclosed in detail for illustrative purposes, it will be recognized that variations or modifications of the disclosed embodiments lie within the scope of the appended claims.

I claim:

1. A lift enhancing arrangement for an aircraft having a fuselage, wings extending from the fuselage, and an engine defining a source of propulsive gases which are exhausted generally rearwardly of said aircraft, the improvement comprising:

nozzle means extending through said fuselage immediately behind the trailing edge root of said wings, and opening into the source of exhaust gases of said aircraft; and means associated with said nozzle means for directing a quantity of exhaust gases through said nozzle means in generally transverse jets along the trailing edge of the wings of said aircraft for entraining the airflow over the wings into said transverse jets to increase air circulation over the wings, to inhibit flow separation, and to thereby increase lift.

2. A lift augmentation system for an aircraft having a fuselage, wings extending from the fuselage, and a jet engine defining a source of propulsive gases which are exhausted generally rearwardly of said aircraft comprising:

nozzle means extending through said fuselage at the trailing edge root of said wings, and opening into the source of exhaust gases of said aircraft for diverting a quantity of said exhaust gases transversely of said aircraft and along the trailing edge of the wings of said aircraft; and means for controlling the quantity of exhaust gases flowing through said nozzle means.

3. The lift augmentation system as in claim 2 further including means forming a swirl generator located within said nozzle means for imparting a swirling motion to gases exiting therethrough.

4. The lift augmentation system as in claim 2 wherein the gases exhausting through said nozzle means cause pitching moment imbalance of said aircraft and further including means for trimming said imbalance by adjusting in a thrust vector assembly of a propulsion nozzle through which gases are exhausted generally rearwardly of said aircraft.

5. The lift augmentation system as in claim 2 wherein said nozzle means is further adjustable to deflect exhaust gases in a forward direction to generate thrust forces opposing the forward motion of the aircraft.

6. The lift augmentation system as in claim 2 wherein control means in said nozzle means adjust the exhaust path of the gases deflected from said main exhaust path for causing the gases to be exhausted in a forward direction to thereby provide a component of reverse thrust.

7. An improvement in a lift system for an aircraft having a fuselage, wings extending from the fuselage, trailing edge flaps on said wings, and an engine defining a source of exhaust gases comprising nozzle means extending through said fuselage proximate the trailing edge of said wings, and opening into the source of exhaust gases of said aircraft for directing a quantity of said exhaust gases exteriorly of said aircraft and substantially parallel to and along the wing trailing edge thereby augmenting the airflow past an aircraft wing to induce lift on the wing and to inhibit flow separation thereby improving the effectiveness of airflow over the trailing edge flap of the wings; and controllable valve means in said nozzle means proximate said gas source end of said nozzle means to control the quantity of gas flowing through said nozzle means.

8. The improvement as in claim 7 wherein said nozzle means extends transversely and includes a swirl generator located with said transverse nozzle means for imparting a swirling motion on gases exiting from the gas source through said nozzle means.

9. The improvement as in claim 8 wherein the swirl generator includes vanes for causing the gases to exhaust from said transverse nozzle means with a swirling motion.

10. The improvement as in claim 7 wherein said nozzle means extends substantially horizontally through the fuselage of the aircraft and ia adjustable to deflect exhaust gases alternatively in a transverse direction for directing the exhaust gases substantially parallel to the wing trailing edge or in a forward direction to generate thrust forces opposing the forward motion of the aircraft.

11. The improvement as in claim 7 wherein control means in said transverse nozzle means adjust the exhaust path of the gases deflected from said main exhaust path for causing the gases to be exhausted in a direction forward of the direction of movement of the aircraft thereby reversing the direction of thrust action.

* * * * *